June 17, 1947.   A. GROSS   2,422,410
REMOVABLE SLIPPER AND SHOE LINING
Filed Jan. 15, 1945   2 Sheets-Sheet 1

INVENTOR.
Albert Gross
BY
ATTORNEY.

June 17, 1947. A. GROSS 2,422,410
REMOVABLE SLIPPER AND SHOE LINING
Filed Jan. 15, 1945 2 Sheets-Sheet 2

INVENTOR.
Albert Gross
BY
ATTORNEY

Patented June 17, 1947

2,422,410

UNITED STATES PATENT OFFICE 2,422,410

REMOVABLE SLIPPER AND SHOE LINING

Albert Gross, Brooklyn, N. Y.

Application January 15, 1945, Serial No. 572,909

1 Claim. (Cl. 36—10)

This invention relates to new and useful improvements in removable slipper and shoe linings.

More particularly, the invention proposes a lining for a slipper shoe and bedroom slipper which is removable and which may take the place of present day permanent linings in shoes and slippers or may be used in addition to linings in footwear. It is generally recognized that perspiration of the feet causes the linings to rot and tear in a short time, while the shoes are still good in other respects. The improved lining may be removed and laundered whenever necessary, which will prevent it from becoming rotted from perspiration.

Another object of the invention is the construction of an article as mentioned which is simple and durable and which may be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
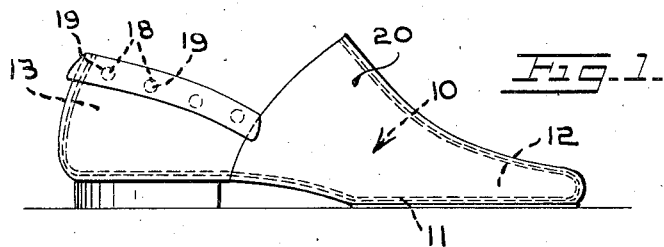
Fig. 1 is a side elevational view of a shoe or slipper equipped with a removable lining constructed in accordance with this invention.
Figure 4:
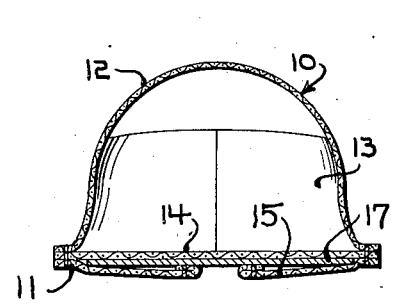
Fig. 4 is a transverse sectional view taken on the line 4—4 of Fig. 2.
Figure 2:
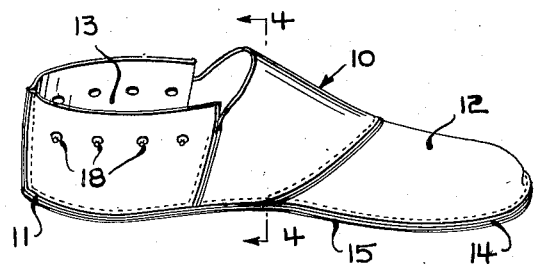
Fig. 2 is a perspective view of the removable lining from the shoe shown in Fig. 1.
Figure 3:
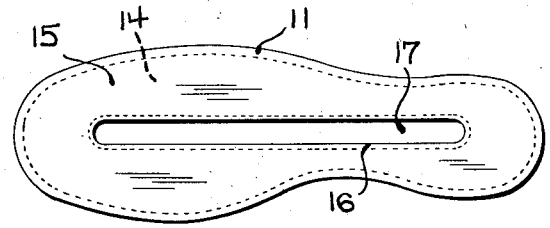
Fig. 3 is a bottom view of the lining shown in Fig. 2.

The removable shoe and slipper lining, in accordance with this invention, includes a lining foot 10 having a sole and heel section 11, a vamp 12 and a counter portion 13. The vamp portion 12 is made from several pieces secured together. Similarly, the counter portion 13 is constructed of several pieces stitched together. An important feature of the invention resides in the specific construction of the sole and heel section 11.

The sole section 11 is made of double layers of material. There is a top layer 14 and a bottom layer 15 which has a longitudinally extending centrally located elongated opening 16. A stiff insole 17, preferably made of relatively stiff leather is engaged between the layers 14 and 15, and which is to hold the material in the proper position and does not allow the sole or upper to be moved, and is removable through the central opening 16.

Fastening elements 18 are mounted along the top edges of the counter portion 13 and are engageable with complementary fastening elements 19 mounted along the upper edge of the counter portion of said shoe, such as a shoe 20 illustrated in Fig. 1.

It is proposed that the new and improved removable shoe and slipper lining be usable with conventional shoes and slippers, or with partially constructed shoes and slippers which are not provided with permanent linings. The new lining 10 is merely engaged into the shoe or slipper and is held in position by the interengagement of the fastening elements 18 and 19.

When it is desired to launder the lining 10 it is merely necessary to open the fasteners 18 and 19, and withdraw the lining from the shoe, or slipper. Then the stiff insole 17 must be removed by spreading open the elongated opening 16. Now, the lining may be washed, dried and pressed. The insole 17 is then replaced and the lining is ready to be placed back into the shoe, or slipper.

Figure 5:
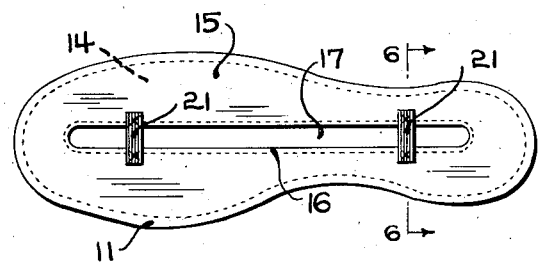
Fig. 5 is a bottom view of another removable shoe and slipper lining constructed in accordance with a modified form of this invention.
Figure 6:
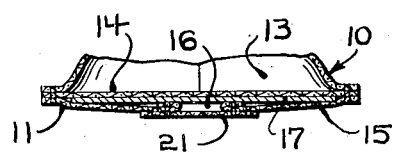
Fig. 6 is a sectional view taken on the line 6—6 of Fig. 5.

In Figs. 5 and 6 a modified form of the invention has been disclosed which is very similar to the prior form, distinguishing merely in the fact that several elastic straps 21 are mounted transversely across the elongated longitudinally extending opening 16 for holding said opening from spreading, while the shoe or slipper is being worn. The stiff insole 17 may be removed merely by stretching the elastic straps 21. When the straps 21 are released, they will assume their original conditions and hold together the side portions of the opening 16.

In other respects this form of the invention is identical to the previous form and like parts are identified by like reference numerals.

Figure 7:
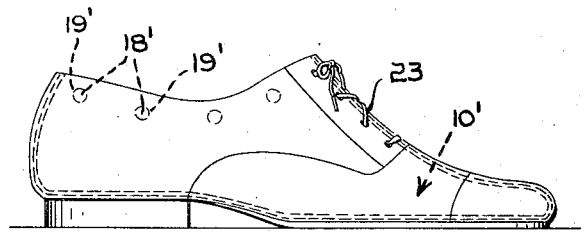
Fig. 7 is a similar view to Fig. 1 showing the invention applied to a shoe.
Figure 8:
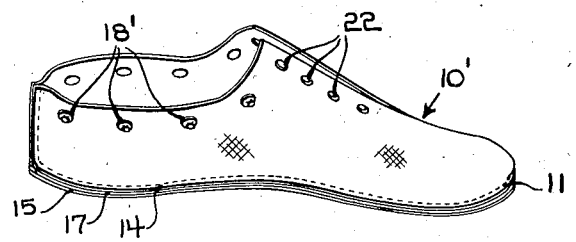
Fig. 8 is a perspective view of another form of shoe lining constructed in accordance with this invention.

In Figs. 7 and 8 the shoe lining 10' is shown with fastening elements 18' and complementary fastening elements 19'. Apertures 22 are provided for permitting the shoe lace 23 to pass therethrough.

Figure 9:
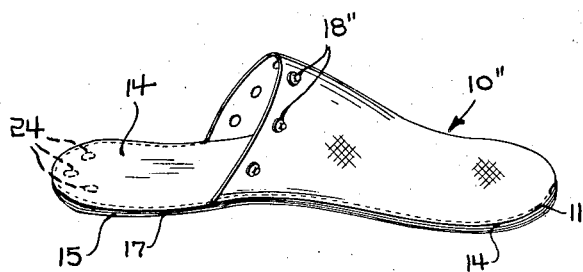
Fig. 9 is a perspective view of a scuff lining constructed in accordance with this invention.

In Fig. 9 the scuff lining 10'' is shown with fastening elements 18" and bottom fastening elements 24.

The use of this removable shoe lining is particularly suitable because of its sanitary character when used in bedroom slippers, due to the fact that the wearer is usually barefooted when wearing such slippers.

While I have illustrated and described the preferred embodiments of my invention, it is to be understood that I do not limit myself to the precise constructions herein disclosed and the right is reversed to all changes and modifications coming within the scope of the invention as defined in the appended claim.

Having thus described my invention, what I claim as new, and desire to secure by United States Letters Patent is:

A removable shoe and slipper lining, comprising a lining foot having a double layered sole, the bottom layer having a longitudinally extending central opening throughout substantially the length of said sole, a stiff insole engaging between said layers and covering said opening and removable by downward pull through said central opening, and elastic bands mounted across the sides of said central opening adjacent the ends thereof for holding the opening in a closed position.

ALBERT GROSS.

REFERENCES CITED

The following references are of record in the file of this patent:

UNITED STATES PATENTS

| Number | Name | Date |
| --- | --- | --- |
| 1,027,249 | Hale | May 21, 1912 |
| 2,031,796 | Stephens | Feb. 25, 1936 |
| 2,003,105 | Caplan | May 28, 1935 |
| 107,767 | Everts | Sept. 27, 1870 |
| 2,238,804 | Brown | Apr. 15, 1941 |